United States Patent
Sevindik

(10) Patent No.: US 11,722,884 B2
(45) Date of Patent: Aug. 8, 2023

(54) UE STORAGE OF UE CONTEXT INFORMATION

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 140 days.

(21) Appl. No.: 17/129,048

(22) Filed: Dec. 21, 2020

(65) Prior Publication Data

US 2022/0201467 A1   Jun. 23, 2022

(51) Int. Cl.
*H04W 8/24* (2009.01)
*H04W 4/08* (2009.01)
*H04W 76/10* (2018.01)

(52) U.S. Cl.
CPC .............. *H04W 8/24* (2013.01); *H04W 4/08* (2013.01); *H04W 76/10* (2018.02)

(58) Field of Classification Search
CPC ..... H04W 88/08; H04W 76/14; H04W 88/02; H04W 88/06; H04W 72/0406; H04W 36/08; H04W 84/12; H04W 76/15; H04W 24/02; H04W 48/16; H04W 76/10; H04W 88/04; H04W 8/005; H04W 92/20; H04W 84/045; H04W 36/14; H04W 48/20; H04W 64/00; H04W 76/28; H04W 36/18; H04W 36/0069; H04W 8/24; H04W 72/1278; H04W 68/02; H04W 72/121; H04W 24/04; H04W 4/40; H04W 76/16; H04W 76/23; H04W 36/0058; H04W 40/22; H04W 36/0016; H04W 36/0011; H04W 4/08; H04W 8/08
See application file for complete search history.

(56) References Cited

U.S. PATENT DOCUMENTS

| | | | |
|---|---|---|---|
| 2015/0334615 A1* | 11/2015 | Zhang | H04W 36/0016 370/331 |
| 2018/0027429 A1* | 1/2018 | Li | H04W 88/04 455/426.1 |
| 2019/0021135 A1* | 1/2019 | Jin | H04W 56/0005 |
| 2019/0349818 A1* | 11/2019 | Li | H04W 40/36 |
| 2019/0394678 A1* | 12/2019 | Syed | H04L 5/0035 |
| 2020/0413443 A1* | 12/2020 | Xing | H04W 72/0453 |
| 2021/0099886 A1* | 4/2021 | Taneja | H04L 5/001 |

* cited by examiner

Primary Examiner — Christopher M Brandt
(74) Attorney, Agent, or Firm — Mendelsohn Dunleavy, P.C.; Steve Mendelsohn

(57) ABSTRACT

In certain embodiments, a (e.g., 5G) wireless network has a (e.g., CBSD) base station and any suitable number of instances of user equipment (UE). For each group of one or more UEs, one of the UEs is designated as a primary UE that stores UE context information for the other (secondary) UEs in the UE group. To connect to a secondary UE, the base station can retrieve the UE context information from the secondary UE's associated primary UE without having to retrieve the secondary UE's context information from the core network, thereby reducing backbone bandwidth usage and delays in connecting the secondary UE, especially when many secondary UE request connections within a short time interval.

28 Claims, 5 Drawing Sheets

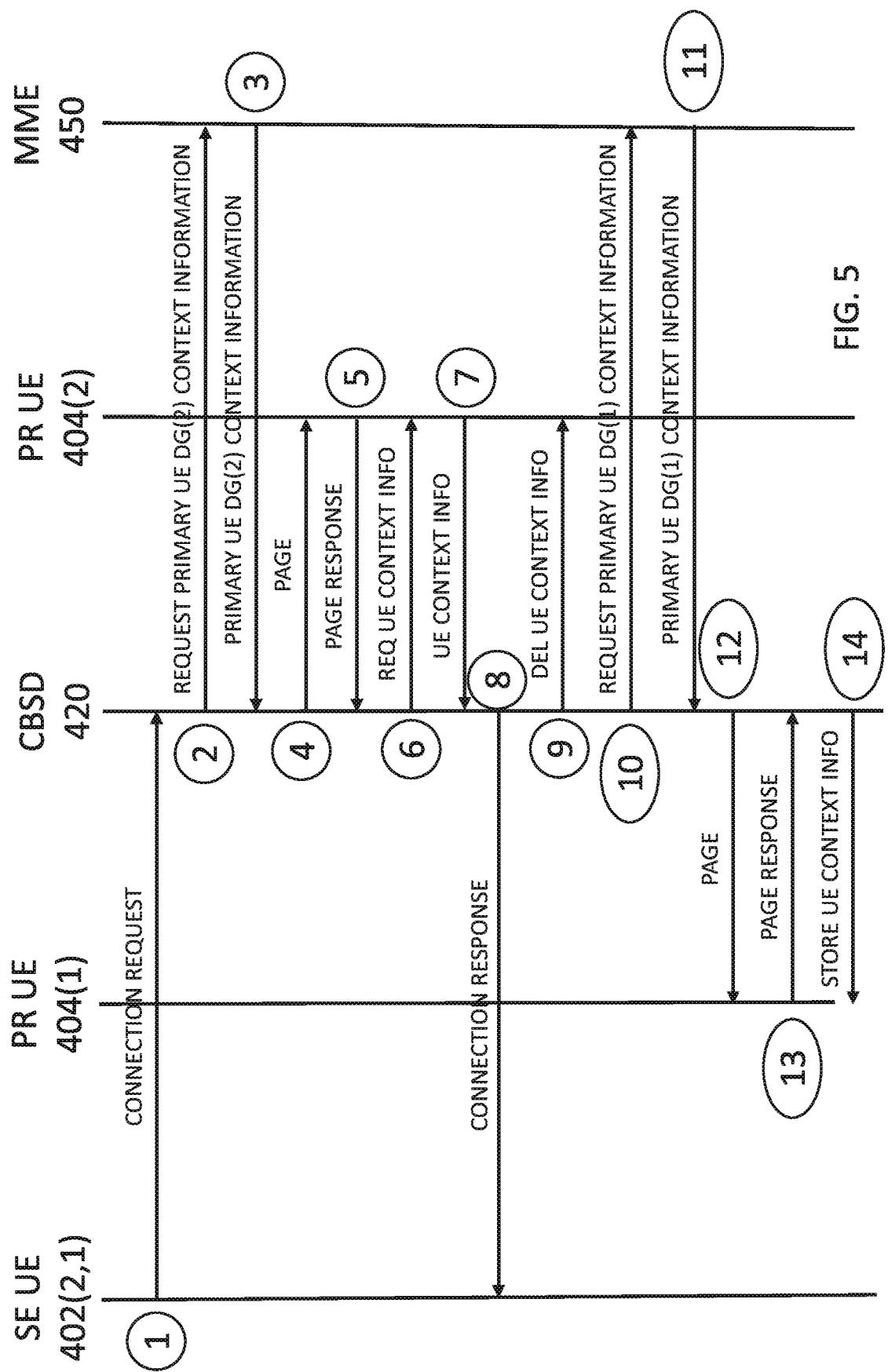

UE STORAGE OF UE CONTEXT INFORMATION

BACKGROUND

Field of the Disclosure

The present disclosure relates to wireless networks and, more specifically but not exclusively, to wireless networks conforming to 5G standards.

Description of the Related Art

This section introduces aspects that may help facilitate a better understanding of the disclosure. Accordingly, the statements of this section are to be read in this light and are not to be understood as admissions about what is prior art or what is not prior art.

FIG. 1 is a simplified block diagram of a portion of a conventional wireless network 100, such as a 5G wireless network. As shown in FIG. 1, a number of (in this example, four) instances of user equipment (UE) 102 communicate wirelessly with a Citizens Broadband Radio Service (CBRS) Device (CBSD) 120, which functions as a wireless base station for the UEs in the wireless network 100. As understood by those skilled in the art, the wireless network 100 may have additional CBSDs, each functioning as the wireless base station for additional UEs. Those skilled in the art will also understand that mobile UEs may move from the coverage area of one CBSD of the wireless network to the coverage area of another CBSD of the wireless network 100.

As used herein, the term "user equipment" and its abbreviation "UE" refer to any suitable wireless device that can communicate with a CBSD of a 5G wireless network. A UE might be fixed (i.e., immobile) or mobile, might be battery power or line powered, and might or might not have its own locating component, such as a GPS receiver. Examples of UEs include (without limitation) (i) mobile phones and other battery-powered mobile devices having GPS receivers as well as (ii) battery-powered, fixed sensors that have no GPS receivers.

In order to preserve battery life, battery-powered UEs are powered down into an idle state when they are not actively communicating with the CBSD. When such a UE has data to transmit to the CBSD, the UE transmits a connection request message to the CBSD to transition from the idle state to a connected state. The connection request message contains a suitable unique identifier, such as a Radio Network Temporary Identifier (RNTI), that uniquely identifies the UE.

In order to establish a connection with the UE, the CBSD needs additional information about the UE—referred to collectively as UE context information—such as (but not limited to) the UE's International Mobile Subscriber Identifier (IMSI), the UE's International Mobile Equipment Identifier (IMEI), and tracking area information for the UE. For both storage space reasons and security reasons, in conventional implementations, the CBSD does not maintain a local database of the UE context information for the UEs in its coverage area. Instead, UE context information for all of the UEs in the wireless network 100 is stored in a Mobility Management Entity (MME) 150 of the core network for the wireless network 100.

When the CBSD receives a connection request from a UE, the CBSD uses the UE's RNTI in the connection request to transmit a request for the UE's context information from the MME (via the CBSD's cable modem 130 and the Cable Modem Termination System (CMTS) network 140), the MME uses the UE's RNTI to retrieve and transmit the UE's context information (via the CMTS network and the cable modem) back to the CBSD, which then uses the UE's context information to establish a connection with the UE, thereby enabling the UE to transmit data and other messages to the CBSD and vice versa.

In a typical, real-world implementation of the wireless network 100, instead of only four UEs 102, there may be hundreds or even thousands of UEs located within the coverage area of a single CBSD and many, if not all, of those UEs may want or need to communicate with (e.g., transmit data to) the CBSD at the same time. In those situations, the CBSD has to retrieve from the MME the UE context information for each of those UEs in order to establish all of the requested connections. Such large numbers of concurrent connection requests and the corresponding retrieval of all of that UE context information from the MME can result in both significant usage of the wireless network's backhaul bandwidth and high processing latencies, which can result in undesirable delays before many of the UEs are able to transmit their data to the CBSD.

SUMMARY

Problems in the prior art are addressed in accordance with the principles of the present disclosure by dividing the UEs currently associated with each CBSD into one or more UE groups, where each UE group has a primary UE and zero, one, or more secondary UEs, where the primary UE is configured to store the UE context information for all of the secondary UEs in its UE group. The CBSD maintains a local database that identifies and links the primary UE and secondary UEs for each of its UE groups. When a secondary UE transmits a connection request to its CBSD to transition from the idle state to the connected state, the CBSD uses the secondary UE's RNTI to identify the RNTI of the primary UE for the secondary UE's UE group. The CBSD then uses the primary UE's RNTI to retrieve the primary UE's context information from the core network's MME. The CBSD then uses the primary UE's context information to establish a connection with the primary UE and retrieves, from the primary UE, (at least) the secondary UE's context information, which the CBSD then uses to establish the requested connection with the secondary UE. In this way, the CBSD is able to establish a connection with the secondary UE (and, in some instances, with many other secondary UEs in the same UE group) with only a single request for UE context information (i.e., the primary UE's context information) from the MME, thereby reducing backhaul bandwidth usage, reducing processing latencies, and reducing delays in the CBSD servicing its UEs.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 5 is a signal flow diagram showing the sequence of messaging involved in a situation in which a mobile secondary UE of FIG. 4 moves from one tracking area of the CBSD to another tracking area of the CBSD, according to one possible implementation.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
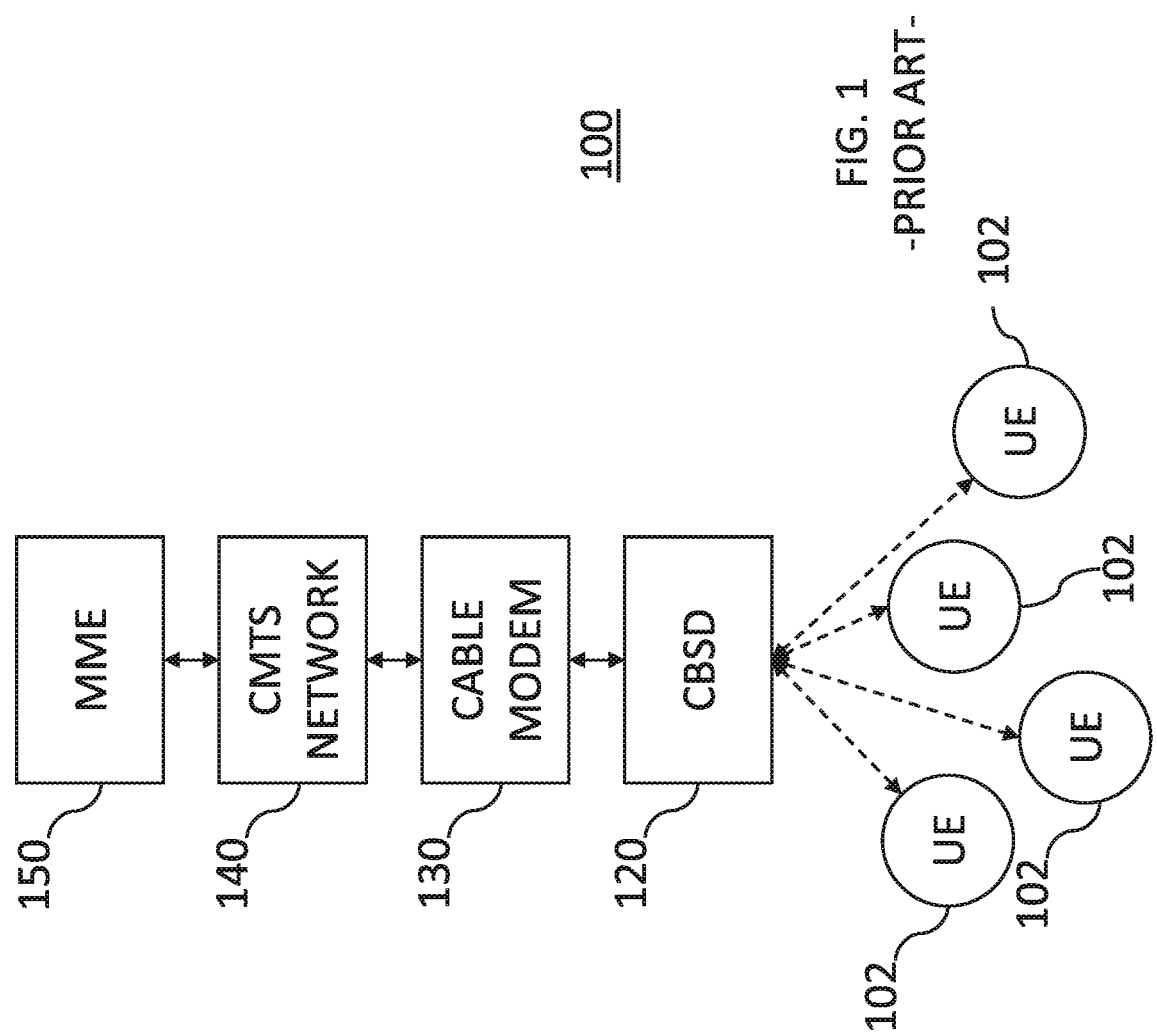
FIG. 1 is a simplified block diagram of a portion of a conventional 5G wireless network.
Figure 2:
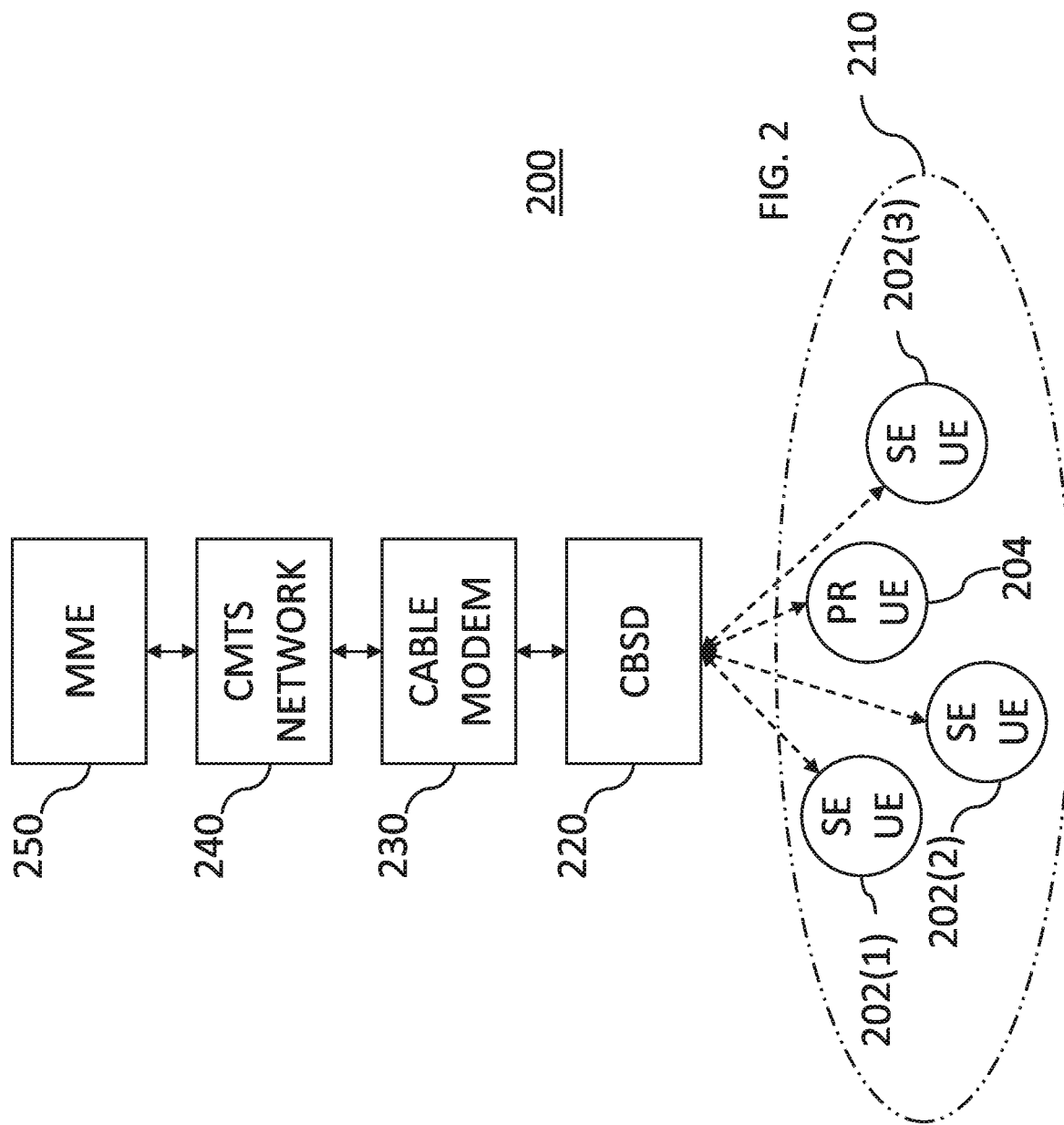
FIG. 2 is a simplified block diagram of a portion of a 5G wireless network, according to one embodiment of the disclosure.

FIG. 2 is a simplified block diagram of a portion of a 5G wireless network 200, according to one embodiment of the disclosure. The wireless network 200 is analogous to the conventional wireless network 100 of FIG. 1 with analogous elements having similar labels. In some implementations, the cable modem 230, the CMTS network 240, and the MME 250 of FIG. 2 are identical to the corresponding elements of FIG. 1.

As shown in FIG. 2, the four UEs are represented as being a primary (PR) UE 204 and three secondary (SE) UEs 202(1)-202(3), where the three secondary UEs 202 are configured to operate the same as the UEs 102 of FIG. 1. The primary UE 204 and the three secondary UEs 202 are shown in FIG. 2 as being members of the same UE group 210. In general, a UE group may have a primary UE and zero, one, or more secondary UEs, and a CBSD may have its UEs divided into one or more UE groups.

The CBSD 220 of FIG. 2 maintains a local database that maps, for the UE group 210, the unique RNTIs of the secondary UEs 202 to and from the RNTI of the primary UE 204, which stores the UE context information for the secondary UEs 202 in the UE group 210. As such, when one of the secondary UEs 202 wants to establish a connection with the CBSD 220, the CBSD can retrieve the UE context information for that secondary UE from the primary UE 204 without having to retrieve that UE context information from the MME 250. When many secondary UEs request connections with the CBSD at the same time, the CBSD's ability to retrieve UE context information from the primary UE rather than from the MME can greatly reduce the latency involved in retrieving that information and thereby avoid undesirable delays in the transmission of the secondary UEs' data to the CBSD.

Figure 3:
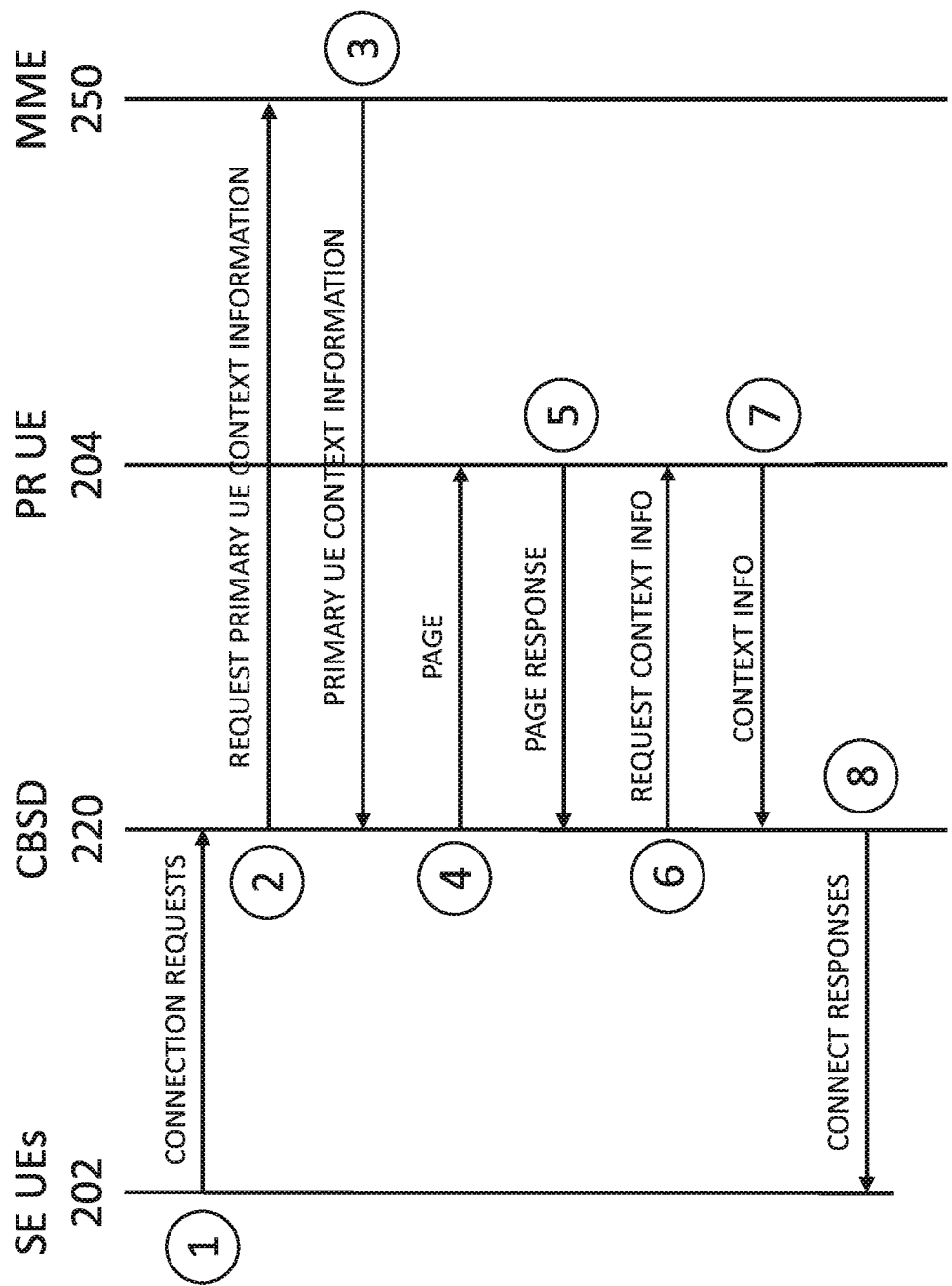
FIG. 3 is a signal flow diagram showing the sequence of messaging involved when a number of secondary UEs in the UE group of FIG. 2 request connections with the CBSD at the same time, according to one possible implementation of the disclosure.

FIG. 3 is a signal flow diagram showing the sequence of messaging involved when a number of secondary UEs 202 in the UE group 210 request connections with the CBSD 220 of FIG. 2 at the same time, according to one possible implementation of the disclosure. The sequence in FIG. 3 is based on the assumption that, just prior to the start of that sequence, the primary UE 204 and the requesting secondary UEs are in the idle state.

The processing begins with Step 1, where the secondary UEs transmit connection requests to the CBSD 220 at (approximately) the same time. (Note that the primary UE 204 might also transmit a connection request to the CBSD at this time, but that particular situation is not shown here.) The CBSD uses the secondary UEs' RNTIs contained in those connection requests to determine that those secondary UEs are in the same UE group 210 as the primary UE 204 and, in Step 2, the CBSD 220 sends a request (containing the primary UE's RNTI) to the MME 250 for the UE context information of the primary UE. In Step 3, the MME provides the primary UE's context information to the CBSD.

In Step 4, the CBSD uses the primary UE's context information to page the primary UE in order to transition the primary UE from the idle state to a connected state, and, in Step 5, the primary UE transmits a page response to the CBSD to establish a connection between the primary UE and the CBSD.

In Step 6, the CBSD transmits a request for UE context information to the primary UE and, in Step 7, the primary UE transmits all of its UE context information (i.e., for all of the secondary UEs 202 in its UE group 210). Note that, in this implementation, the primary UE always transmits all of its UE context information to the CBSD whenever any one or more or even all of the secondary UEs 202 request a connection. In this way, the CBSD needs to request context information from the primary UE only once for each set of concurrent communication sessions with any or all of the associated secondary UEs. Note that, in some implementations of the disclosure, the CBSD and the primary UE may also support an operation where the CBSD is able to request retrieval, from the primary UE, of the UE context information for a single, specified secondary UE in the same UE group.

In Step 8, the CBSD uses the appropriate secondary UE context information received from the primary UE to transmit connection request responses to the multiple secondary UEs' original connection requests of Step 1 to establish a connection with each of those secondary UEs.

In this way, the CBSD 220 of FIG. 2 can establish connections with any number of the secondary UEs 202 in the UE group 210 with only a single request to the MME 250, thereby greatly reducing both the backhaul traffic and the delays in establishing those connections compared to the conventional technology of the wireless network 100 of FIG. 1.

Note that, when the CBSD 220 wants to initiate a connection with a particular secondary UE (or multiple connections with multiple secondary UEs of the same UE group), the processing may start with Step 2 of FIG. 3 and end with the CBSD paging the one or more secondary UEs and those secondary UEs responding, instead of Step 8.

When a new UE is added within the coverage area of a CBSD, either because it is a newly provisioned UE or because it is a mobile UE that has just physically moved into the coverage area of the CBSD, the new UE and the CBSD will perform conventional operations to ensure that UE context information (including an RNTI) for the new UE is generated and stored in the MME. In addition, the CBSD will either (i) assign the new UE as a secondary UE to an existing UE group and instruct the primary UE for that existing UE group to add the new UE's context information to the primary UE's store or (ii) start a new UE group with the new UE designated as the primary UE for that new UE group.

As mentioned previously, a CBSD may have hundreds or even thousands of UEs currently located within its coverage area. In order to reduce storage requirements at a primary UE and avoid undesirable latencies in transmitting UE context information from a primary UE to the CBSD, in certain implementations, the UEs for a CBSD may be divided into multiple UE groups, with each UE group having a primary UE and no more than a specified maximum number of secondary UEs.

Figure 4:
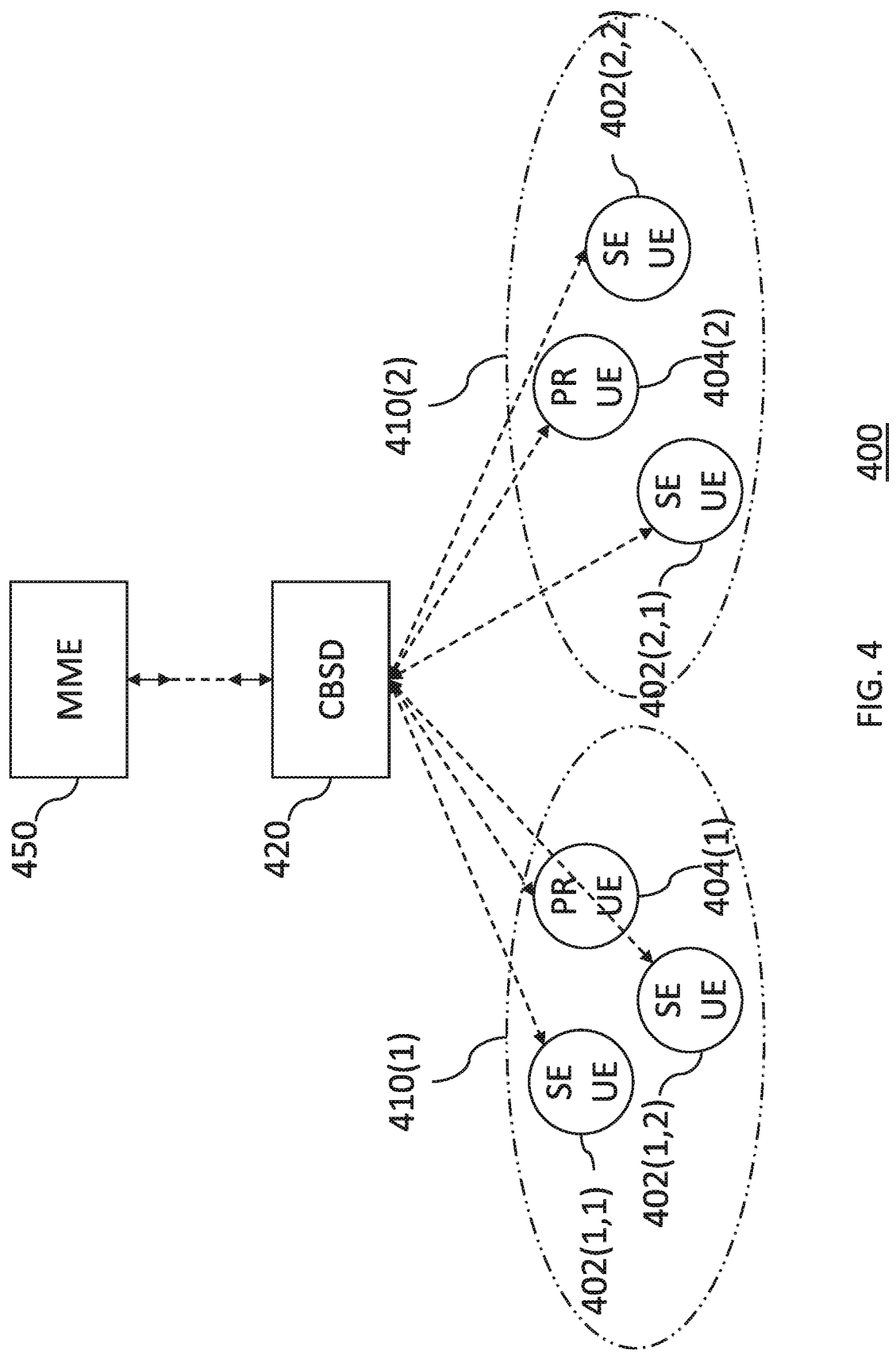
FIG. 4 is a simplified block diagram of a portion of a 5G wireless network, according to another embodiment of the disclosure.

FIG. 4 is a simplified block diagram of a portion of a 5G wireless network 400, according to another embodiment of the disclosure. The wireless network 400 is analogous to the wireless network 200 of FIG. 2 with analogous elements having similar labels. Note that the cable modem and CMTS network of the network 400 are not shown in FIG. 4. As shown in FIG. 4, the UEs are organized into two UE groups 410(1) and 410(2), where the UE group 410(1) has primary UE 404(1) and two secondary UEs 402(1,1)-(1,2), while the UE group 410(2) has primary UE 404(2) and two secondary UEs 402(2,1)-402(2,2).

In some implementations of the disclosure, the UEs are divided into UE groups based on their geographical locations within the coverage area of the CBSD. In some implementations, the coverage area of a CBSD is divided into multiple, contiguous tracking areas that collectively span the CBSD's coverage area and where the UEs currently located within each tracking area are organized into one or more UE groups, depending on how many UEs are currently located within the tracking area.

In some implementations of the wireless network 400 of FIG. 4, some or even all of the UEs may be fixed, but in other implementations, some or even all of the UEs may be mobile, where a mobile UE can physically move from being within one tracking area of a CBSD to being within a different tracking area of that same CBSD. The wireless network 400 of FIG. 4 is configured to handle such situations by updating both the definitions of its UE groups and the configurations of its primary UEs as needed. Note that this capability is based on the ability of the CBSD 420 to determine the current locations of its mobile UEs at least to the resolution of the CBSD's tracking areas. Such ability may rely on the mobile UEs having GPS receivers that enable the UEs to inform the CBSD of their current tracking areas. Note further that mobile UEs are also able to move from the coverage area of one CBSD of a wireless network to the coverage area of another CBSD of the same wireless network (or even of a different wireless network). The wireless network(s) are also configured to handle those situations by extending the principles described herein to those situations.

FIG. 5 is a signal flow diagram showing the sequence of messaging involved in a situation in which a mobile secondary UE 402 of FIG. 4 moves from one tracking area of the CBSD 420 to another tracking area of the CBSD 420, according to one possible implementation. In this particular situation, secondary UE 402(2,1) of FIG. 4 moves from the geographical area corresponding to the UE group 410(2) to the geographical area corresponding to the UE group 410(1). As with the sequence in FIG. 4, the sequence in FIG. 5 is based on the assumption that, just prior to the start of that sequence, the primary UEs 204(1) and 204(2) and all of their associated secondary UEs 202(1,1)-202(2,2) are in the idle state.

The processing of FIG. 5 begins at Step 1, after the secondary UE 402(2,1) has moved into the coverage area of the UE group 410(1), with the secondary UE 402(2,1) transmitting a connection request to the CBSD 420. In response, the CBSD uses the secondary UE's RNTI to determine that the primary UE 404(2) is the current primary UE for the secondary UE 402(2,1) and, in Step 2, the CBSD uses that primary UE's RNTI to request the UE context information for the primary UE 404(2) from the MME 450. In Step 3, the MME 450 provides the UE context information for the primary UE 404(2) to the CBSD. In Step 4, the CBSD uses that retrieved UE context information to page the primary UE 404(2). In Step 5, the primary UE 404(2) transmits a page response to the CBSD to connect to the CBSD. In Step 6, the CBSD transmits a request to the primary UE 404(2) to retrieve the UE context information for (at least) the secondary UE 402(2,1). In Step 7, the primary UE 404(2) transmits the UE context information for (at least) the secondary UE 402(2,1) to the CBSD. In Step 8, the CBSD uses the UE context information for the secondary UE 402(2,1) to transmit a connection request response to the secondary UE 402(2,1) to establish a connection between the CBSD and the secondary UE 402(2,1).

As part of the establishment of the connection between the CBSD and the secondary UE 402(2,1), the secondary UE 402(2,1) informs the CBSD of its current location within the tracking area that corresponds to UE group 410(1) and the CBSD recognizes that the secondary UE 402(2,1) has moved and now needs to be reassigned from UE group 410(2) to another UE group, in this case, UE group 410(1). As such, in Step 9, the CBSD instructs the primary UE 404(2) to delete the UE context information for the secondary UE 402(2,1) from its local UE context information database.

In addition, the CBSD determines that the primary UE 404(1) is the primary UE for the secondary UE 402(2,1)'s new UE group 410(1) and, in Step 10, the CBSD uses the RNTI of the primary UE 404(1) to request the UE context information for that primary UE from the MME 450. In Step 11, the MME 450 provides the UE context information for the primary UE 404(1) to the CBSD. In Step 12, the CBSD uses that retrieved UE context information to page the primary UE 404(1). In Step 13, the primary UE 404(1) transmits a page response to the CBSD to connect to the CBSD. In Step 14, the CBSD transmits the UE context information for the secondary UE 402(2,1) to the primary UE 404(1) and instructs the primary UE 404(1) to store the UE context information for the secondary UE 402(2,1) in its store of UE context information for UE group 410(1).

Note that, in other implementations, rather than retrieving the UE context information for the secondary UE 402(2,1) from the primary UE 404(2), the CBSD retrieves that UE context information from the MME 450, which, like the conventional MME 150 of FIG. 1, maintains the UE context information for all primary and secondary UEs in the network 400.

Note that, instead of a mobile secondary UE moving from one tracking area to another tracking area of the same CBSD, it is also possible for a mobile primary UE to move from one tracking area to another tracking area. For example, referring again to FIG. 4, the primary UE 404(2)

may move from the geographical area corresponding to the UE group 410(2) to the geographical area corresponding to the UE group 410(1). The CBSD may recognize that that has occurred after the primary UE 404(2) establishes a connection with the CBSD and informs the CBSD of its new tracking area. In that case, the CBSD performs operations to reconfigure the primary UE 404(2) as a secondary UE in the UE group 410(1) and reconfigure one of the secondary UEs in the UE group 410(2) (for example, secondary UE 402(2, 2)) to be the new primary UE for that UE group. These operations involve:

The CBSD retrieving the stored UE context information from the primary UE 404(2);

The CBSD instructing the primary UE 404(2) to delete its stored UE context information;

The CBSD reconfiguring the secondary UE 402(2,2) to be the new primary UE for the UE group 410(2) by instructing the secondary UE 402(2,2) to store UE context information for the remaining UEs in UE group 410(2); and The CBSD instructing the primary UE 404(1) for the UE group 410(1) to add the UE context information for the primary UE 404(2) to its local UE context information database to complete the process of reconfiguring the primary UE 404(2) to be a secondary UE of the UE group 410(1).

As described above, a secondary UE is capable of being reconfigured to be a primary UE, and vice versa. In some implementations, some of the secondary UEs might not be able to be configured to be primary UEs, where the CBSD knows which secondary UEs do and which secondary UEs do not have that capability.

The processing involved in handling mobile UEs that move between different tracking areas of a CBSD as discussed above and shown in FIG. 5 for secondary UEs and as discussed above for primary UEs is based on the assumption that the CBSD will organize its UEs based on their geographical locations within the coverage area of the CBSD. In alternative implementations of the disclosure, that assumption is not made. Instead, in certain implementations, whenever a new UE appears in the coverage area of a CBSD, the CBSD assigns that UE to be either a secondary UE of an existing UE group or the primary UE of a new UE group and that UE will retain that assignment as long as it remains within the coverage area of the CBSD, even if the UE moves between different tracking areas of that CBSD. In those implementations, the handoff processing between different UE groups described above for UEs moving between different tracking areas of a CBSD does not have to be performed. As long as the UE remains somewhere within the coverage area of the CBSD, the UE will retain its original assignment within the same UE group as either the UE group's primary UE or one of the UE group's secondary UEs.

Only when a UE is removed from the coverage area of the CBSD will the CBSD have to adjust the UE group of that removed UE. In particular, if the removed UE is a secondary UE, then the CBSD will instruct the primary UE for that UE group to delete the UE context information for the removed secondary UE, and, if the removed UE is a primary UE, then the CBSD will need to designate one of the secondary UEs of that UE group to be the new primary UE for that UE group. This latter processing may involve the CBSD having to request the UE context information for the remaining secondary UEs in the UE group from the MME.

The adjusting of a UE group described in the previous paragraph requires the CBSD to know that the UE has been removed from its coverage area. In some implementations, the CBSD may keep track of the last time that each of its UEs was connected with the CBSD and, when the duration since that last time reaches a specified threshold level, the CBSD assumes that the UE has been removed. In addition or alternatively, if the CBSD pages a UE and the UE does not respond, then the CBSD assumes that the UE has been removed.

Although the disclosure has been described in the context of 5G wireless networks that operate in the CBRS spectrum, those skilled in the art will understand that the disclosure can be implemented as 5G wireless networks that operate in other 5G spectra as well as wireless networks conforming to communications standards other than 5G.

In certain embodiments, the present disclosure is a base station for a wireless network and a method for a base station of a wireless network, the base station comprising a memory and at least one hardware processor, wherein the base station retrieves, from a first user equipment (UE), UE context information for at least one second UE different from the first UE, and uses the retrieved UE context information to communicate with the second UE.

In at least some of the above embodiments, the wireless network is a 5G wireless network, and the base station is a Citizens Broadband Radio Service (CBRS) device (CBSD).

In at least some of the above embodiments, the wireless network has a plurality of UEs associated with the base station; the base station is configured to support the plurality of UEs being divided into one or more UE groups, each UE group comprising a primary UE and zero, one, or more secondary UEs, wherein the primary UE is configured to store UE context information for each secondary UE in the UE group; and the first and second UEs are part of a first UE group; the first UE is the primary UE for the first UE group; and the second UE is a secondary UE in the first UE group.

In at least some of the above embodiments, when the second UE is in an idle state and has data to transmit to the base station, the second UE transmits a connection request to the base station; the base station determines that the first UE is the primary UE for the second UE; the base station retrieves UE context information for the first UE from a core network for the wireless network; the base station uses the first UE's context information to establish a connection with the first UE; the base station retrieves the second UE's context information from the first UE; and the base station uses the second UE's context information to communicate with the second UE.

In at least some of the above embodiments, when the base station detects that the second UE has moved from a location of the first UE group to a location of a second UE group, the base station communicates with the first UE to remove the second UE from the first UE group; and the base station communicates with the primary UE for the second UE group to add the first UE to the second UE group.

In at least some of the above embodiments, when the base station detects that the first UE has moved from a location of the first UE group to a location of a second UE group, the base station communicates with a secondary UE of the first UE group to configure the secondary UE as the new primary UE for the first UE group; and the base station communicates with the first UE and with the primary UE for the second UE group to configure the first UE as a secondary UE of the second UE group.

In certain embodiments, the present disclosure is a first UE for a wireless network, the first UE comprising a memory and at least one hardware processor, wherein the first UE is configured to store UE context information for at least one second UE different from the first UE; and transmit the UE context information for the second UE to a base station of the wireless network.

In at least some of the above embodiments, the wireless network is a 5G wireless network; and the base station is a CBSD.

In at least some of the above embodiments, the wireless network has a plurality of UEs associated with the base station; the base station is configured to support the plurality of UEs being divided into one or more UE groups, each UE group comprising a primary UE and zero, one, or more secondary UEs, wherein the primary UE is configured to store UE context information for each secondary UE in the UE group; and the first and second UEs are part of a first UE group; the first UE is the primary UE for the first UE group; and the second UE is a secondary UE in the first UE group.

In at least some of the above embodiments, when the second UE is in an idle state and has data to transmit to the base station, the second UE transmits a connection request to the base station; the base station determines that the first UE is the primary UE for the second UE; the base station retrieves UE context information for the first UE from a core network for the wireless network; the base station uses the first UE's context information to establish a connection with the first UE; the base station retrieves the second UE's context information from the first UE; and the base station uses the second UE's context information to communicate with the second UE.

In at least some of the above embodiments, when the base station detects that the second UE has moved from a location of the first UE group to a location of a second UE group, the base station communicates with the first UE to remove the second UE from the first UE group; and the base station communicates with the primary UE for the second UE group to add the first UE to the second UE group.

In at least some of the above embodiments, when the base station detects that the first UE has moved from a location of the first UE group to a location of a second UE group, the base station communicates with a secondary UE of the first UE group to configure the secondary UE as the new primary UE for the first UE group; and the base station communicates with the first UE and with the primary UE for the second UE group to configure the first UE as a secondary UE of the second UE group.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A base station for a wireless network, the base station comprising a memory and at least one hardware processor, wherein the base station is configured to:
   retrieve, from a first user equipment (UE), UE context information for at least one second UE different from the first UE; and
   use the retrieved UE context information to communicate directly with the second UE, wherein:
      the wireless network has a plurality of UEs associated with the base station;
      the base station is configured to support the plurality of UEs being divided into one or more UE groups, each UE group comprising a primary UE and zero, one, or more secondary Ues, wherein the primary UE is configured to store UE context information for each secondary UE in the UE group; and
      the first and second UEs are part of a first UE group;
      the first UE is the primary UE for the first UE group; and
      the second UE is a secondary UE in the first UE group.

2. The base station of claim 1, wherein:
the wireless network is a 5G wireless network; and
the base station is a Citizens Broadband Radio Service (CBRS) device (CBSD).

3. The base station of claim 1, wherein:
the base station receives a connection request from the second UE;
the base station determines that the first UE is the primary UE for the second UE;
the base station retrieves UE context information for the first UE from a core network for the wireless network;
the base station uses the first UE's context information to establish a connection with the first UE;
the base station retrieves the second UE's context information from the first UE; and
the base station uses the second UE's context information to communicate with the second UE.

4. The base station of claim 1, wherein:
the base station detects that the second UE has moved from a location of the first UE group to a location of a second UE group;
the base station communicates with the first UE to remove the second UE from the first UE group; and
the base station communicates with the primary UE for the second UE group to add the first UE to the second UE group.

5. The base station of claim 1, wherein:
the base station detects that the first UE has moved from a location of the first UE group to a location of a second UE group;
the base station communicates with a secondary UE of the first UE group to configure the secondary UE as the new primary UE for the first UE group; and
the base station communicates with the first UE and with the primary UE for the second UE group to configure the first UE as a secondary UE of the second UE group.

6. The base station of claim 1, wherein the UE context information for the second UE comprises one or more of:
an International Mobile Subscriber Identifier (IMSI) for the second UE;
an International Mobile Equipment Identifier (IMEI) for the second UE; and
tracking area information for the second UE.

7. The base station of claim 6, wherein the base station does not maintain a database containing the UE context information for the second UE.

8. A method for a base station of a wireless network, the method comprising:
the base station retrieving, from a first UE, UE context information for at least one second UE different from the first UE; and
the base station using the retrieved UE context information to communicate directly with the second UE, wherein:
the wireless network has a plurality of UEs associated with the base station;
the base station supports the plurality of UEs being divided into one or more UE groups, each UE group comprising a primary UE and zero, one, or more secondary Ues, wherein the primary UE stores UE context information for each secondary UE in the UE group; and
the first and second UEs are part of a first UE group;
the first UE is the primary UE for the first UE group; and
the second UE is a secondary UE in the first UE group.

9. The method of claim 8, wherein:
the base station receives a connection request from the second UE;
the base station determines that the first UE is the primary UE for the second UE;
the base station retrieves UE context information for the first UE from a core network for the wireless network;
the base station uses the first UE's context information to establish a connection with the first UE;
the base station retrieves the second UE's context information from the first UE; and
the base station uses the second UE's context information to communicate with the second UE.

10. The method of claim 8, wherein the UE context information for the second UE comprises one or more of:
an IMSI for the second UE;
an IMEI for the second UE; and
tracking area information for the second UE.

11. The base station of claim 10, wherein the base station does not maintain a database containing the UE context information for the second UE.

12. A first UE for a wireless network, the first UE comprising a memory and at least one hardware processor, wherein the first UE is configured to:
store UE context information for at least one second UE different from the first UE;
receive, from a base station of the wireless network, a request for the UE context information for the second UE; and
transmit the UE context information for the second UE to the base station of the wireless network to enable the base station to use the retrieved UE context information to communicate directly with the second UE, wherein:
the wireless network has a plurality of UEs associated with the base station;
the plurality of Ues are divided into one or more UE groups, each UE group comprising a primary UE and zero, one, or more secondary Ues, wherein the primary UE is configured to store UE context information for each secondary UE in the UE group; and
the first and second Ues are part of a first UE group;
the first UE is the primary UE for the first UE group; and
the second UE is a secondary UE in the first UE group.

13. The first UE of claim 12, wherein:
the wireless network is a 5G wireless network; and
the base station is a CBSD.

14. The first UE of claim 12, wherein the first UE receives communication from the base station to remove the second UE from the first UE group.

15. The first UE of claim 12, wherein:
the first UE has moved from a location of the first UE group to a location of a second UE group; and
the first UE communicates with the base station to configure the first UE as a secondary UE of the second UE group.

16. A method for a first UE of a wireless network, the method comprising:
the first UE storing UE context information for at least one second UE different from the first UE;
the first UE receiving, from a base station of the wireless network, a request for the UE context information for the second UE; and
the first UE transmitting the UE context information for the second UE to the base station of the wireless network to enable the base station to use the retrieved UE context information to communicate directly with the second UE, wherein:
the wireless network has a plurality of UEs associated with the base station;
the plurality of UEs are divided into one or more UE groups, each UE group comprising a primary UE and zero, one, or more secondary Ues, wherein the primary UE stores UE context information for each secondary UE in the UE group; and
the first and second UEs are part of a first UE group;
the first UE is the primary UE for the first UE group; and
the second UE is a secondary UE in the first UE group.

17. The first UE of claim 12, wherein the UE context information for the second UE comprises one or more of:
an IMSI for the second UE;
an IMEI for the second UE; and
tracking area information for the second UE.

18. The method of claim 16, wherein the UE context information for the second UE comprises one or more of:
an IMSI for the second UE;
an IMEI for the second UE; and
tracking area information for the second UE.

19. A base station for a wireless network, the base station comprising a memory and at least one hardware processor, wherein the base station is configured to:
retrieve, from a first user equipment (UE), UE context information for at least one second UE different from the first UE; and
use the retrieved UE context information to communicate with the second UE, wherein:
the wireless network has a plurality of UEs associated with the base station;
the base station is configured to support the plurality of UEs being divided into one or more UE groups, each UE group comprising a primary UE and zero, one, or more secondary UEs, wherein the primary UE is configured to store UE context information for each secondary UE in the UE group;
the first and second UEs are part of a first UE group;
the first UE is the primary UE for the first UE group; and
the second UE is a secondary UE in the first UE group.

20. The base station of claim 19, wherein:
the base station receives a connection request from the second UE;
the base station determines that the first UE is the primary UE for the second UE;
the base station retrieves UE context information for the first UE from a core network for the wireless network;
the base station uses the first UE's context information to establish a connection with the first UE;
the base station retrieves the second UE's context information from the first UE; and
the base station uses the second UE's context information to communicate with the second UE.

21. The base station of claim 19, wherein:
the base station detects that the second UE has moved from a location of the first UE group to a location of a second UE group;
the base station communicates with the first UE to remove the second UE from the first UE group; and
the base station communicates with the primary UE for the second UE group to add the first UE to the second UE group.

22. The base station of claim 19 wherein:
the base station detects that the first UE has moved from a location of the first UE group to a location of a second UE group;
the base station communicates with a secondary UE of the first UE group to configure the secondary UE as the new primary UE for the first UE group; and
the base station communicates with the first UE and with the primary UE for the second UE group to configure the first UE as a secondary UE of the second UE group.

23. A method for a base station of a wireless network, the method comprising:
the base station retrieving, from a first UE, UE context information for at least one second UE different from the first UE; and
the base station using the retrieved UE context information to communicate with the second UE, wherein:
the wireless network has a plurality of UEs associated with the base station;
the base station supports the plurality of UEs being divided into one or more UE groups, each UE group comprising a primary UE and zero, one, or more secondary UEs, wherein the primary UE stores UE context information for each secondary UE in the UE group;
the first and second UEs are part of a first UE group;
the first UE is the primary UE for the first UE group; and
the second UE is a secondary UE in the first UE group.

24. The method of claim 23, wherein:
the base station receives a connection request from the second UE;
the base station determines that the first UE is the primary UE for the second UE;
the base station retrieves UE context information for the first UE from a core network for the wireless network;
the base station uses the first UE's context information to establish a connection with the first UE;
the base station retrieves the second UE's context information from the first UE; and
the base station uses the second UE's context information to communicate with the second UE.

25. A first UE for a wireless network, the first UE comprising a memory and at least one hardware processor, wherein the first UE is configured to:
store UE context information for at least one second UE different from the first UE; and
transmit the UE context information for the second UE to a base station of the wireless network, wherein:
the wireless network has a plurality of UEs associated with the base station;
the plurality of UEs are divided into one or more UE groups, each UE group comprising a primary UE and zero, one, or more secondary UEs, wherein the primary UE is configured to store UE context information for each secondary UE in the UE group;
the first and second UEs are part of a first UE group;
the first UE is the primary UE for the first UE group; and
the second UE is a secondary UE in the first UE group.

26. The first UE of claim 25, wherein the first UE receives communication from the base station to remove the second UE from the first UE group.

27. The first UE of claim 25, wherein:
the first UE has moved from a location of the first UE group to a location of a second UE group; and
the first UE communicates with the base station to configure the first UE as a secondary UE of the second UE group.

28. A method for a first UE of a wireless network, the method comprising:
the first UE storing UE context information for at least one second UE different from the first UE; and
the first UE transmitting the UE context information for the second UE to a base station of the wireless network, wherein:
the wireless network has a plurality of UEs associated with the base station;
the plurality of UEs are divided into one or more UE groups, each UE group comprising a primary UE and zero, one, or more secondary UEs, wherein the primary UE stores UE context information for each secondary UE in the UE group;
the first and second UEs are part of a first UE group;
the first UE is the primary UE for the first UE group; and
the second UE is a secondary UE in the first UE group.

* * * * *